(12) United States Patent
Pavlidis et al.

(10) Patent No.: US 10,769,655 B2
(45) Date of Patent: Sep. 8, 2020

(54) SYSTEM, METHOD, AND NON-TRANSITORY COMPUTER-READABLE STORAGE MEDIA FOR PROVIDING A CUSTOMER WITH A SUBSTITUTE COUPON

(71) Applicant: Wal-Mart Stores, Inc., Bentonville, AR (US)

(72) Inventors: Yannis Pavlidis, Boulder, CO (US); Mukesh Jain, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 557 days.

(21) Appl. No.: 14/725,462

(22) Filed: May 29, 2015

(65) Prior Publication Data
US 2016/0350793 A1 Dec. 1, 2016

(51) Int. Cl.
*G06Q 30/02* (2012.01)

(52) U.S. Cl.
CPC ..... *G06Q 30/0238* (2013.01); *G06Q 30/0236* (2013.01); *G06Q 30/0268* (2013.01); *G06Q 30/0269* (2013.01); *G06Q 30/0271* (2013.01)

(58) Field of Classification Search
CPC ........... G06Q 30/0238; G06Q 30/0236; G06Q 30/0268; G06Q 30/0269; G06Q 30/0271
See application file for complete search history.

(56) References Cited

U.S. PATENT DOCUMENTS

| | | | | |
|---|---|---|---|---|
| 5,128,520 A | * | 7/1992 | Rando | G06K 7/10871 235/375 |
| 5,353,218 A | * | 10/1994 | De Lapa | G06Q 20/20 705/14.25 |
| 5,822,735 A | * | 10/1998 | De Lapa | G06Q 20/20 235/375 |
| 7,198,192 B2 | * | 4/2007 | Page | G06Q 30/02 235/380 |
| 2002/0037097 A1 | * | 3/2002 | Hoyos | G06K 9/00449 382/137 |
| 2003/0024981 A1 | * | 2/2003 | Narasimhan | G06Q 30/02 235/383 |
| 2004/0073577 A1 | * | 4/2004 | Brady | G06Q 30/02 |
| 2004/0260605 A1 | * | 12/2004 | McIntyre | G06Q 30/02 705/14.39 |
| 2006/0100931 A1 | * | 5/2006 | Deaton | G06Q 20/20 705/15 |
| 2007/0288313 A1 | * | 12/2007 | Brodson | G06Q 20/20 705/14.17 |
| 2008/0281910 A1 | * | 11/2008 | Trioano | H04L 51/10 709/203 |
| 2010/0280873 A1 | * | 11/2010 | Bryant | G06Q 30/02 705/14.38 |
| 2011/0091092 A1 | * | 4/2011 | Nepomniachtchi | G06K 9/00463 382/139 |
| 2011/0196732 A1 | * | 8/2011 | Schueller | G06Q 20/20 705/14.33 |
| 2012/0130788 A1 | * | 5/2012 | Winslade | G06Q 30/02 705/14.23 |

(Continued)

*Primary Examiner* — Raquel Alvarez
(74) *Attorney, Agent, or Firm* — Bryan Cave Leighton Paisner LLP (57) ABSTRACT

In different embodiments of the present invention, systems, methods, and computer-readable storage media may be used to provide for a substitute coupon to a customer to replace a digital coupon that has been denied.

25 Claims, 3 Drawing Sheets

(56) References Cited

U.S. PATENT DOCUMENTS

| | | | |
|---|---|---|---|
| 2013/0006744 A1* | 1/2013 | Redford | G06Q 30/02 |
| | | | 705/14.26 |
| 2013/0117083 A1* | 5/2013 | Gossett | G06Q 30/02 |
| | | | 705/14.13 |
| 2013/0275197 A1* | 10/2013 | Thibedeau | G06Q 30/0225 |
| | | | 705/14.26 |
| 2014/0257956 A1* | 9/2014 | Durbha | G06Q 30/0225 |
| | | | 705/14.23 |
| 2016/0035019 A1* | 2/2016 | Rosner | G06Q 30/0613 |
| | | | 705/80 |
| 2016/0180421 A1* | 6/2016 | Wegner | G06Q 30/0611 |
| | | | 705/80 |

* cited by examiner

SYSTEM, METHOD, AND NON-TRANSITORY COMPUTER-READABLE STORAGE MEDIA FOR PROVIDING A CUSTOMER WITH A SUBSTITUTE COUPON

FIELD OF THE DISCLOSURE

The present invention relates to the development of customers of a retail (online and/or brick and mortar) store, and more particularly, to systems, methods, and computer-readable storage media that may provide a substitute coupon for a mistakenly denied coupon.

BACKGROUND

It is common for (online and/or brick and mortar) retailers to use customer loyalty accounts to attract and retain customers. One aspect of such customer loyalty programs is the distribution and use of digital coupons. Digital coupons may be provided to customers in many different ways, e.g., via the retailer's web page, through the retailer's "app" on a mobile device, via an email message directed to the customer, or via an advertisement. Regardless how, the digital coupon is provided, the customer can choose and store ("clip") the digital coupon in a customer account.

Digital coupons may be similar to paper coupons in that both types of coupons may be utilized on one or more associated products. The products on which the coupon may be applied can be identified using a product code, e.g., a Universal Product Code (UPC) or a Stock Keeping Unit (SKU).

In the case of a paper coupon, the product codes for which the coupon is used may be printed on the paper coupon. In some instances, the product codes printed on the paper coupon may be wrong. For instance, the product code for which the coupon should be valid may have been mistakenly not included on the paper coupon. In such instances, the checkout person at the point of sale can read the paper coupon and may have the authority to apply the paper coupon to a product whose product code is not printed on the paper coupon. Since the customer may discuss whether a paper coupon could or should apply, the customer has a sense of control. This sense of control may be lost with digital coupons which the checkout person is generally unable to override.

Digital coupons may be utilized in a similar manner. The customer shops at a retail store, and when finished, proceeds to a point of sale (POS) terminal. The items the customer has chosen may be based, in part, on the digital coupons stored in their account. When the customer reaches the POS terminal, the customer identifies themselves to access their account, e.g., by entry of a telephone number associated with the customer account. Each digital coupon may have one or more product codes associated therewith. And if the product code of one of the product the customer has chosen to purchase matches a product code associated with one of the digital coupons in the customer account, the digital coupon may be applied.

However, in some situations, the product codes that are associated with a digital coupon may be wrong or incomplete. For instance, a product code that should be included, may be mistakenly not included. And thus, the digital coupon is not applied to the customer's order. In this case, the checkout person may not have access to the digital coupon and may not have the authority to override the POS terminal and apply the coupon. Thus, the customer is mistakenly prohibited from utilizing an otherwise valid coupon.

In addition, a potential sale may be lost if the customer, e.g., during an online order, realizes that a digital coupon is not being utilized and there is no process to raise or resolve the issue.

The present invention is aimed at one or more of the problems identified above.

SUMMARY OF THE INVENTION

In different embodiments of the present invention, systems, methods, and computer-readable storage media may be used to provide for a substitute coupon to a customer.

In one embodiment of the present invention, a system includes a memory unit, a coupon redemption unit, and a coupon substitution unit. The memory unit stores customer data associated with a plurality of customers in respective customer records. The customer data for each of the plurality of customers includes a customer identifier. The customer record is associated with one of the plurality of customers includes a digital coupon associated with at least one product. The coupon redemption unit receives data associated with a potential purchase associated with the one of the plurality of customers and includes a subject product to be purchased. The coupon redemption unit compares the subject product to the at least one product associated with the digital coupon, approves utilization of the digital coupon for the potential purchase if the subject product matches the at least one product associated with the digital coupon and denies utilization of the digital coupon for the potential purchase if the subject product does not match the at least one product associated with the digital coupon. The coupon substitution unit, if utilization of the digital coupon has been denied, receives a support ticket and stores a substitute coupon in the customer record of the one of the plurality of customers as a function of the support ticket.

In another embodiment of the present invention, a method is provided. The method includes the storing, in a memory unit, customer data associated with a plurality of customers in respective customer records. The customer data for each of the plurality of customers includes a customer identifier. The customer record associated with one of the plurality of customers includes a digital coupon associated with at least one product. The method further includes receiving, by a coupon redemption unit coupled to the memory unit, data associated with a potential purchase associated with the one of the plurality of customers including a subject product to be purchased. The method further includes the steps of comparing, by the coupon redemption unit, the subject product to the at least one product associated with the digital coupon, approving utilization of the digital coupon for the potential purchase if the subject product matches the at least one product associated with the digital coupon, and denying utilization of the digital coupon for the potential purchase if the subject product does not match the at least one product associated with the digital coupon. The method also includes the step of receiving, if utilization of the digital coupon has been denied, by a coupon substitution unit coupled to the memory unit, a support ticket and storing a substitute coupon in the customer record of the one of the plurality of customers as a function of the support ticket.

In still another embodiment of the present invention, one or more non-transitory computer-readable storage media, having computer-executable instructions embodied thereon, wherein when executed by at least one processor, the computer-executable instructions cause the processor to operate as a memory unit, a coupon redemption unit, and a coupon substitution unit. The memory unit stores customer data associated with a plurality of customers in respective customer records. The customer data for each of the plurality of customers includes a customer identifier. The customer record is associated with one of the plurality of customers includes a digital coupon associated with at least one product. The coupon redemption unit receives data associated with a potential purchase associated with the one of the plurality of customers and includes a subject product to be purchased. The coupon redemption unit compares the subject product to the at least one product associated with the digital coupon, approves utilization of the digital coupon for the potential purchase if the subject product matches the at least one product associated with the digital coupon and denies utilization of the digital coupon for the potential purchase if the subject product does not match the at least one product associated with the digital coupon. The coupon substitution unit, if utilization of the digital coupon has been to denied, receives a support ticket and stores a substitute coupon in the customer record of the one of the plurality of customers as a function of the support ticket.

BRIEF DESCRIPTION OF THE FIGURES

Other advantages of the present disclosure will be readily appreciated, as the same becomes better understood by reference to the following detailed description when considered in connection with the accompanying drawings wherein:

Non-limiting and non-exhaustive embodiments of the present invention are described with reference to the following figures, wherein like reference numerals refer to like parts throughout the various views unless otherwise specified.

FIG. 4 is a flowchart of a method that may be used with the system shown in FIG. 1, according to an embodiment of the present invention; and, Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "unit", "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes a system, method, and computer program product that may be used to provide digital coupons for use by a customer and, if utilization of a digital coupon is denied, to provide a substitute coupon if it is determined that utilization of the digital coupon should have been approved. Additionally, the system, method and computer program product may add the product for which utilization of the digital coupon was denied to the list of approved products for the digital coupon so as future customers will not face issues/problems when attempting to redeem the coupon.

With reference to the FIGS. and in operation, the present invention provides a system 10, methods and computer product media that has stored thereon, a computer program that provides a substitute coupon for a digital coupon that was mistakenly denied for utilization. In one aspect of the present invention, the digital coupon was stored in customer account associated with a customer. The customer account is stored, along with the customer account of other customers, in a database. In general, the digital coupon may be used when the customer visits a retail establishment of a retailer. The customer may traverse the store and assemble the items or products the customer desires to purchase and/or the customer's orders may also have been pre-assembled for pickup. The customer proceeds to a check-out station that has a point of sale (POS) terminal that is generally being operated by a checkout person. The checkout person may scan the items in the customer's order and once completed, the customer establishes payment for the order.

During this process, the customer may identify themselves to establish associated with their customer account in the database. For instance, the customer may provide a telephone number that is associated with their customer account. The telephone number may be entered by the customer in a keypad or provided to the checkout person who enters the telephone number. Customer identification and access to their customer account may be established in any suitable manner, including, but not limited to utilization of a credit or ATM card that is linked to the customer account and/or utilization of a loyalty card and/or entry of a personal identification card.

The customer account may have included, i.e., stored therein, one or more digital coupons. Digital coupons may have been provided and stored to the customer account in any suitable manner, including, but not limited to, automatically (based on historical use or purchasing by the customer) or added by the customer ("clipped"). The customer may clip a digital coupon via the retailer's web page, through the retailer's "app" on a mobile device, via an email message directed to the customer, or via an advertisement. One manner of clipping a coupon to a customer account may be reading a code, such as a barcode or a QR code.

Once the customer's order has been established and the customer account has been accessed, the digital coupons stored in the customer account may be accessed and compared against the products in the order to determine if any of the digital coupons are applicable to any of the product in the order. If any of the coupons are applicable, then the applicable digital coupons may be automatically applied. As is known, coupons may provide for any sort of discount or offer, including, but not limited to, a percentage discount on the associated product, a specified monetary amount off, and/or any other discount or special.

As is discussed more fully below, if utilization of a coupon is denied, the customer may initiate a review process to determine if the digital coupon should have been applied, and if it is determined that the digital coupon should have been applied, then the system, method, and computer program product may provide or assign and store in the customer account, a substitute coupon. The substitute coupon may be a coupon that provides the same discount or offer as the denied digital coupon. Alternatively, the substitute coupon may provide a different discount or offer as the denied coupon. For instance, the substitute coupon may provide a discount, typically, a set monetary amount, that may be applied the customer's next order, without any specific product requirements. Additionally, the system, method, and computer program product, may provide for modification of the digital coupon that was originally denied to allow for utilization against the denied product in the future.

Figure 1:
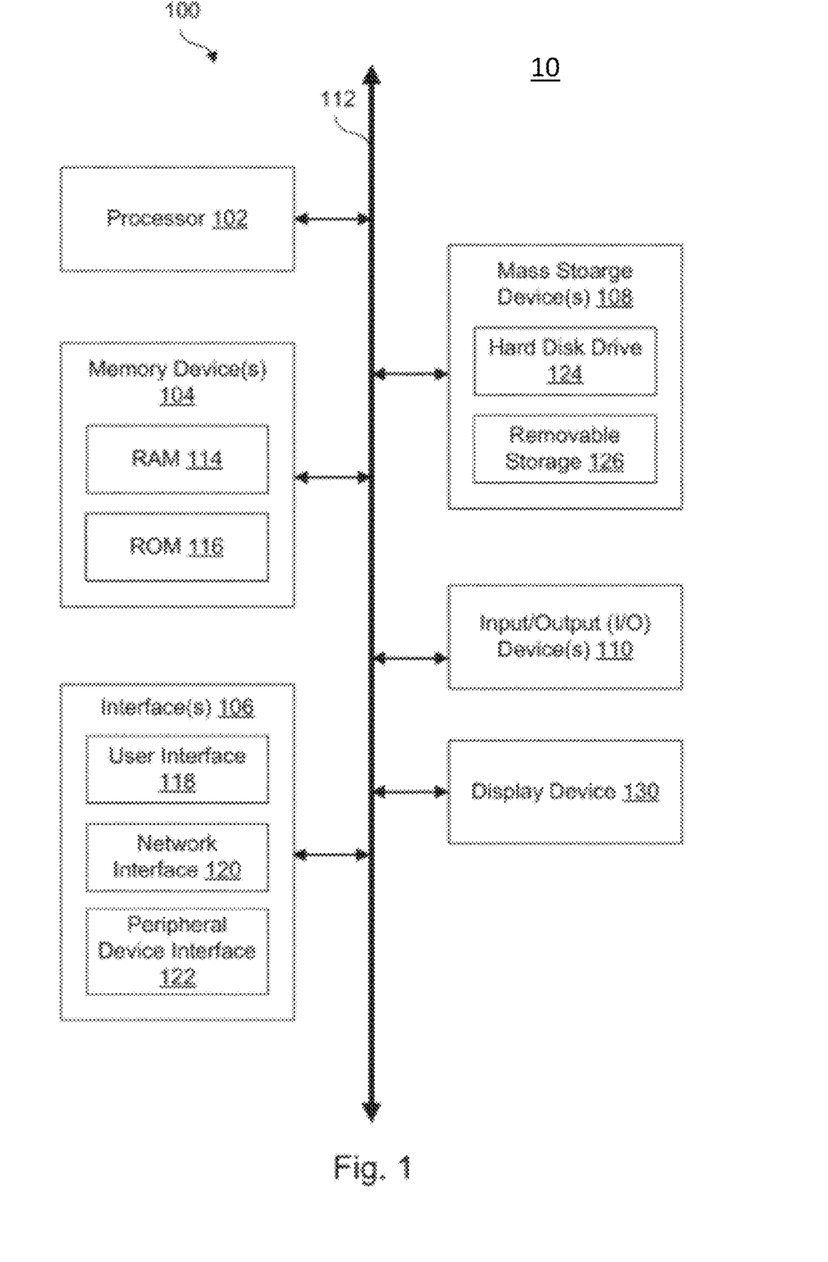
FIG. 1 is a schematic illustrating various aspects of a system, according to the present disclosure.

FIG. 1 is a block diagram illustrating an exemplary computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
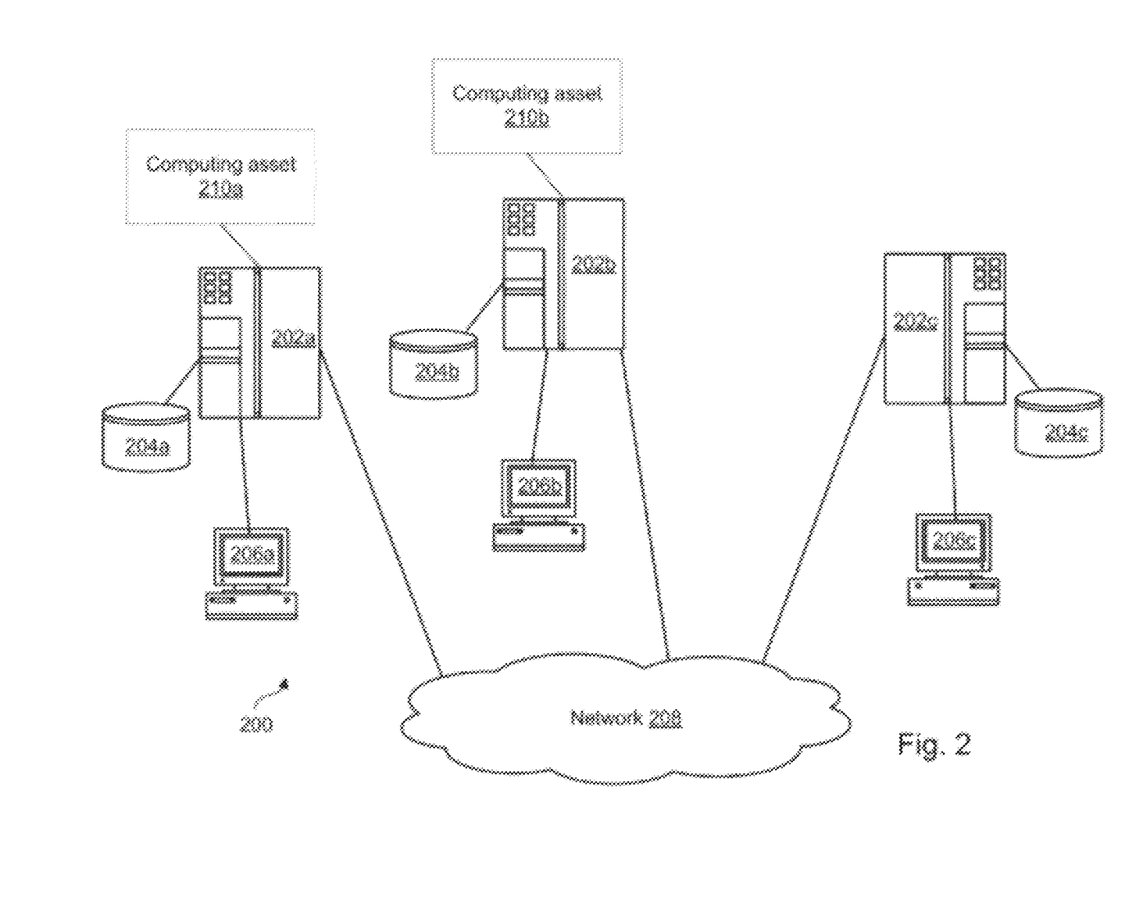
FIG. 2 is a schematic illustrating example components of computer network, according to an embodiment of the present invention.

FIG. 2 illustrates a networked environment 200 in which methods described herein may be used. The environment 200 may include a plurality of computer servers 202a-202c. The servers 202a-202c may be geographically separated, such as in different cities, countries, or continents. The methods disclosed herein may also advantageously be used with computer servers 202a-202c that are located within the same facility. The computer servers 202a-202c may be operably coupled to one or more databases 204a-204c for storing operational and/or executable data. A user wishing to access data and functionality of the computer servers 202a-202c and databases 204a-204c may do so by means of terminals 206a-206c operably coupled thereto. The computer servers 202a-202c and/or terminals 206a-206c may have some or all of the attributes of the computing device 100 of FIG. 1. The terminals 206a-206c may be a/workstation, tablet computer, smart phone, or any other computing device. The servers 202a-202c may be operably connected to one another by a network 208. The network 208 may include a local area network (LAN), wide area network (WAN), the Internet, or a combination of any of these.

The servers 202a-202b may be used to manage and/or monitor activity at one or more computing assets 210a-210b. The computing assets 210a-210b may include a number of servers, workstations, tablet computers, smart phones, and the like. The computing assets 210a-210b may also include electronically controlled physical systems, i.e., door locks, climate control systems, alarm systems, and the like. The physical systems of the computing assets 210a-210b may also be controlled and/or monitored by a server, such as a server 202a-202c.

A server 202c may operate as a global server 202c operable to monitor and report on security data gathered from the servers 202a-202b, operating as asset server 202a-202b, and the corresponding computing assets 210a-210b. Alternatively, the global server 202c may communicate directly with computing resources of the computing assets 210a-210b such that asset servers 202a-202b may be omitted or bypassed.

Figure 3:
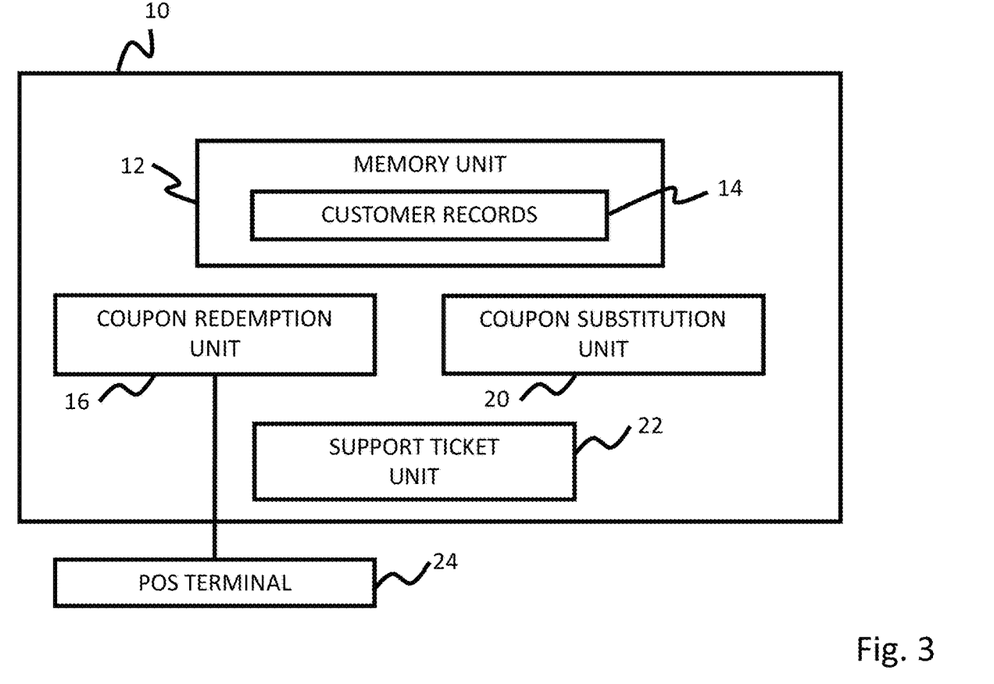
FIG. 3 is a functional schematic of the present invention, according to an embodiment of the present invention.

With reference to FIG. 3, the system 10 includes a memory unit 12, a coupon redemption unit 14, a coupon substitution unit 16, and a plurality of customer records 18 stored in the memory unit. The system 10 may also include a support ticket unit 20.

In one embodiment, the memory unit 12 may be configured to store data associated with a plurality of customers. The data may be stored in customer accounts or records 14 (each customer account 14 being associated with a customer) and may be associated with a customer loyalty program.

And as discussed above, the customer accounts 14 may include one or more digital coupons. Information related to the digital coupons, including, e.g., the products associated with the digital coupon, may be stored within the customer account 14 or may be stored in a separate coupon database. The digital coupon stored in the customer account 14 may include a reference to information stored in the coupon database.

The data stored in each customer account 14 may also include a customer identification number. The customer identification may be a unique identification number associated with a customer loyalty program or may be a number associated with the customer, e.g., a telephone number, credit card number, or the like.

Each digital coupon is associated with at least one product. The products associated with a particular coupon may be identified using a product code, e.g., a Universal Product Code (UPC) or a Stock Keeping Unit (SKU). More than one product may be associated with a single coupon. Generally, the products associated with a single coupon are related in some manner, e.g., manufacturer, product type, etc. . . . For instance, a digital coupon may have associated therewith different sizes of sealable food storage bags and/or boxes of the sealable food storage bags having a different number of bags therein, by the same manufacturer. Each product associated with the same digital coupon will have a different product code, e.g., different UPC or SKU.

The coupon redemption unit 16 is coupled to the memory unit 12 and is configured to receive data associated with a potential purchase associated with the one of the plurality of customers. For example, the data associated with a potential purchase may be received from a point of sale (POS) terminal 24 located at a retail store (not shown). The customer may have place an order online and arranged for pickup at the retail store or may have traveled to the retail store and selected the products to be purchased directly.

The customer may identify themselves at the POS terminal by any suitable means, e.g., through scanning or reading of a credit card or customer loyalty program card at the POS terminal or by entry of a telephone number associated with the customer account. Once the items or products selected by the customer have been scanned, e.g., by a checkout person, the list of subject products to be purchased are sent to the coupon redemption unit 16. The coupon redemption unit 16 is configured to compare the subject products to the at least one product associated with any digital coupon stored in the customer account of the customer.

If the subject product matches one of the products associated with one of the digital coupon stored in the customer account, utilization of the matching digital coupon may be approved by the coupon redemption unit 16. The coupon redemption unit 16 may send the approval and the digital coupon to the POS terminal 24. The discount associated with the digital coupon may then be applied to the customer's purchase.

If, however, the subject product does not match the at least one product associated with one of the digital coupons, utilization will be denied. In one aspect of the present invention, the customer and/or checkout person may be informed of any digital coupons that have been applied to the order.

The coupon substitution unit 22 is coupled to the memory unit 12 and, if utilization of the digital coupon has been denied, is configured to receive a support ticket and to store a substitute coupon in the customer record of the one of the plurality of customers as a function of the support ticket.

At any point during the purchase process or thereafter, the customer may realize that a digital coupon that the customer assumed or thought would be applicable for a product that was purchased, was in fact, not applied. If this occurs, in one aspect of the present invention, the customer may follow a process that utilizes the support ticket unit 22 to request that the denial of a digital coupon be review.

For example, once the customer realizes or believes that a digital coupon was improperly denied, the customer may contact a customer support representative (CSR) via telephone, app on a mobile device, such as a cell phone, through a message app, email application, or other application on a computing device, or through a website. Through this communication channel, the customer may explain to the CSR the details of their purchase and identification of the digital coupon the customer believes should have been applied. The CSR may enter this data as a request for reconsideration into the support ticket unit 22.

Alternatively, the customer may directly interface with the support ticket unit 22 via an app on a mobile device, such as a cell phone, through a message app, email application, or other application on a computing device, or through a website to enter the details of their purchase and identification of the digital coupon the customer believes should have been applied. Based on this data, i.e., a request for reconsideration, the support ticket unit 22 may then automatically create a support ticket.

The support ticket unit 22 generates the support ticket as a function of the request for reconsideration and sends the support ticket to the coupon substitution unit 20.

In some instances, the subject product was erroneously not included in the original definition of the digital coupon. In this scenario, the coupon substitution unit 20 may be further configured to associate the subject product with the digital coupon if the request is approved.

Each digital coupon has a coupon value associated therewith. The coupon value may include, but is not limited to, a percentage discount on the associated product, a specified monetary amount off, and/or any other discount or special. The substitute coupon has a substitute value that is related to the coupon value. For instance, if the digital coupon provides for a specific monetary amount off the price of a product, the substitute value may be equal to, or greater than the digital coupon value, but it will generally be at least the same value. In one aspect of the present invention, the substitute value may be applied to a subsequent purchase. In one embodiment, application of the substitute value to the subsequent purchase is independent of any product in the subsequent purchase. In other words, the customer does not need to buy the same product in order to the substitute coupon to be applied.

In one aspect of the present invention, a customer service representative may interact with the coupon substitution unit 20 to determine if the subject product matches the at least one product associated with the digital coupon. The at least one product associated with the digital coupon has an associated identification code and the subject product has an associated identification code. The customer service representative may determine that that the subject product matches the at least one product associated with the digital coupon even if the identification code associated with the subject product does not match the identification associated with the at least one product associated with the digital coupon. For example, the product code of the subject product was mistakenly or inadvertently not included in the original digital coupon. Or, the retailer or manufacturer of the product, after review, has decided to include the subject product in the products associated with the digital coupon.

After the coupon substitution unit 20 has stored the substitute coupon in the customer account, the coupon substitution unit 20 may be further configured to send an electronic message, i.e., text, email message, and/or voice-mail message, to the one of the plurality of customers. The electronic message may indicate to the one of the plurality of customers a status of the support ticket, i.e., substitute coupon issued or denied. Resolution of the support ticket whether approved or denied may also be saved (in the coupon database) so that the resolution may be applied to a similar support ticket in the future to save time and increase efficiency in the system or process.

Figure 4:
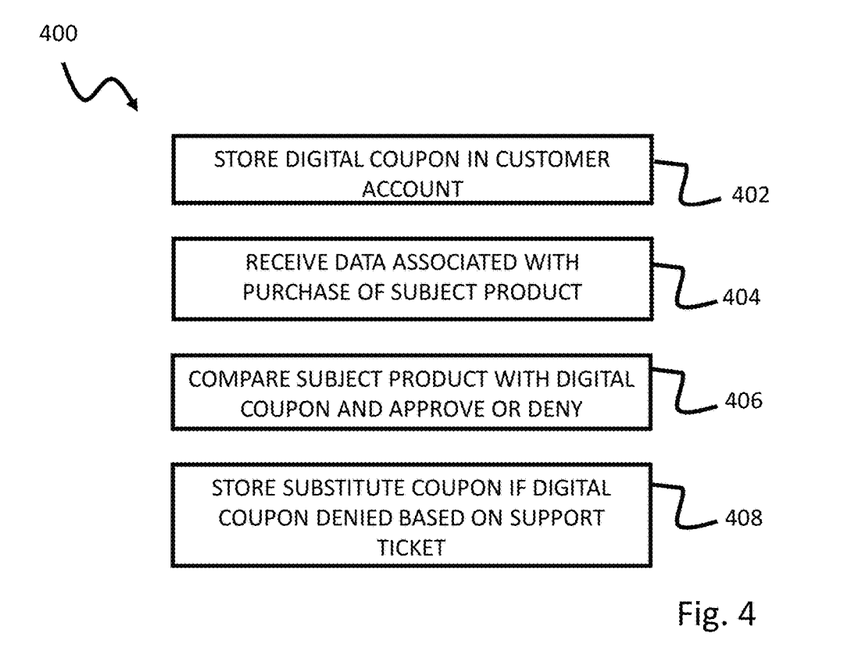

FIG. 4 is a flowchart of a method 400 that may be used with the system 10 to provide a substitute coupon to a customer. In a first step 402, customer data associated with a plurality of customers is stored in the memory unit 12 in respective customer records. The customer data for each of the plurality of customers includes a customer identifier. The customer record associated with one of the plurality of customers includes a digital coupon associated with at least one product. In a second step 404, data associated with a potential purchase associated with the one of the plurality of customers is received, by a coupon redemption unit coupled to the memory unit. The data associated with the potential purchase includes a subject product to be purchased.

In a third step 406, the coupon redemption unit 16 compares the subject product to the at least one product associated with the digital coupon. If the subject product matches the at least one product associated with the digital coupon, utilization of the digital coupon is approved. If the subject product does not match the at least one product associated with the digital coupon then utilization of the digital coupon is denied.

In a fourth step 408, the coupon substitution unit 20 is receives a support ticket and stores a substitute coupon in the customer record of the one of the plurality of customers as a function of the support ticket.

The present invention may allow for use of both paper coupons and digital coupons in the same transaction. If there is a conflict between use of a paper coupon and a digital coupon, the precedence or priority may be defined by the system 10 or method 400. The present invention may also review a support ticket for evidence of fraud or attempted system. For instance, if a customer attempts to use a paper coupon and a digital coupon, the digital coupon may not be approved and utilized if the paper coupon has priority. If the customer attempts to dispute the denial of the digital coupon after the transaction, then the system 10 needs to flag that a (paper) coupon had already been redeemed (for that particular product in that transaction).

In one embodiment of the present invention, the memory unit 12 includes one or more of the memory devices 104 and/or mass storage devices 108 of one or more of the computing devices 100. The units that comprise the invention are composed of a combination of hardware and software, i.e., the hardware as modified by the applicable software applications. In one embodiment, the units of the present invention are comprised of one of more of the components 102, 104, 106, 108, 110, 112, 130 of one or more of the computing devices (whether computer/network server 202A, 202b, 202C, computing asset 210a, 20b, or terminal 20ga, 206b, 206c), as modified by one or more software applications.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

INDUSTRIAL APPLICABILITY

With reference to the drawings, and in operation, the present invention provides a system, method, and one or more non-transitory computer-readable storage media, having computer-executable instructions embodied thereon, that a substitute coupon to a customer to replace a digital coupon that has been denied.

In one specific embodiment, operation of the system, method, and one or more non-transitory computer-readable storage media, having computer-executable instructions embodied thereon, is described below.

Once the customer realizes or believes that a digital coupon has not been applied, the customer contact customer support, via an application user interface through the web, email program, and/or through a telephone customer support number. The customer provides: a transaction code, an identification of the digital coupon that did not work, a list of the UPC's for that coupon and an email address. Based on this information, a support ticket is generated, e.g., via the support ticket unit 22.

Through the coupon substitution unit, a customer service representative reviews the support ticket and determines if the coupon is a valid coupon. For instance, if the subject product is not of the same type as required by the digital coupon, e.g., the customer purchased a regular yogurt while the coupon is only for a Greek yogurt, then the digital coupon is not valid for the product purchased by the customer. If the digital coupon is not valid, then the customer is sent an email with the reason explaining why the coupon is not a valid coupon. It should be noted that the customer service representative may be a person or may be a specific combination of software and hardware and may utilize a learning program to determine if the coupon is valid.

If the coupon is valid, then the coupon substitution unit 20 is used to compare the UPC of the subject product against the UPCs of the products that should be associated with the digital coupon.

If the UPC of the subject product is part of the coupon offer, and erroneously not included in the coupon database, the customer service representative, using the coupon substitution unit 20, issues a substitute coupon to the customer and verifies that the substitute has been added to the customer account. An email is also sent to the customer confirming that the substitute coupon has been added to their account. The customer service representative also sends the support ticket to a customer service team who investigates the issue and fixes the error, i.e., makes sure that the UPC of the subject product has been added to the coupon database as being associated with the digital coupon.

If the UPC is not part of the coupon offer, the customer service representative may also issue a substitute coupon based on the circumstance even if the subject product was not intended to be part of the offer. A pool of substitute coupons may be provided for this purpose and the customer service representative may issue one of the substitute coupons from the pool. In one embodiment, the pool includes substitute coupons of set values, and the customer service representative may issue a substitute coupon have a set value closest to the value of the digital coupon.

If the UPC is not part of the coupon offer, but a substitute coupon is provided to the customer, the support ticket is further investigated to determine if the UPC of the subject product should be included in the digital coupon. For example, the manufacturer or supplier of the subject product is informed of the issue and the UPC of the subject product is included in the digital coupon if the manufacturer or supplier agrees.

The above description of illustrated examples of the present invention, including the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
    a memory unit configured to store customer data associated with a first customer of a plurality of customers stored in an account of the first customer with a retailer, wherein the account of the first customer of the plurality of customers includes at least a customer identifier and at least one digital coupon associated with at least one product sold by the retailer, wherein one or more digital coupons are provided by the retailer or the first customer, by using an application ("app") downloaded to an electronic device of the first customer, wherein the app is configured to electronically clip the one or more digital coupons from a webpage to be uploaded to the account of the first customer, and wherein the one or more digital coupons comprise the at least one digital coupon;
    a coupon redemption unit coupled to the memory unit and configured to receive data associated with a potential purchase by the first customer, wherein the one or more digital coupons stored in the account of the first customer are accessed by a point of sale (POS) terminal of the retailer, wherein the one or more digital coupons stored in the account of the first customer are valid; and
    a coupon substitution unit coupled to the memory unit, wherein:
        the coupon redemption unit is further configured to receive a list of products scanned by the POS terminal for the potential purchase by the first customer;
        the coupon redemption unit is further configured to compare a subject product of the list of products with the one or more digital coupons stored in the account of the first customer;
        the coupon redemption unit is further configured to determine when the subject product matches a product type required by the at least one digital coupon and, after determining a match exists, to approve a utilization of the at least one digital coupon for the potential purchase of the subject product, wherein the coupon redemption unit transmits an approval and the at least one digital coupon to the POS terminal for application of the at least one digital coupon to the potential purchase of the subject product by the first customer;
        the coupon redemption unit is further configured to store the approval of the utilization of the at least one digital coupon, wherein the coupon redemption unit transmits an approval of at least one other digital coupon to the POS terminal for application of the at least one other digital coupon to a potential purchase of an other customer of the plurality of customers;
        the coupon redemption unit is further configured to determine when the subject product does not match the product type required by the at least one digital coupon and, after determining a match does not exist, to transmit a denial of the at least one digital coupon as not valid for the subject product such that the at least one digital coupon is not applied to the potential purchase of the subject product of the first customer, wherein the at least one digital coupon was mistakenly denied;
        responsive to the denial of use of the at least one digital coupon, the coupon redemption unit is further configured to transmit an electronic message to the electronic device of the first customer comprising one or more explanations why the at least one digital coupon was denied as invalid based on a product type of the subject product being different from the product type required by the at least one digital coupon;
        the coupon redemption unit is further configured to receive, from the first customer, a request for reconsideration of the denial based on one or more reasons why the at least one digital coupon was mistakenly denied as invalid, wherein the request for reconsideration initiates a review process to review a validity of the at least one digital coupon from the account of the first customer;
        the coupon redemption unit is further configured to generate a support ticket stored in the account of the first customer when the review process determines that a valid digital coupon was improperly denied during the potential purchase by the first customer;
        the coupon substitution unit is configured to (i) store a substitute digital coupon for the at least one digital coupon that was mistakenly denied to be transmitted to the account of the first customer of the plurality of customers as a function of the support ticket, the substitute digital coupon for utilization during a subsequent purchase of the first customer and (ii) inform a third party that supplied the at least one digital coupon of an issue corresponding to the at least one digital coupon that was mistakenly denied; and
        after the at least one digital coupon was mistakenly denied, the coupon redemption unit is further configured to add the subject product to a list of approved products to which the at least one digital coupon can be applied for redemption for other potential purchases by the plurality of customers.

2. The system of claim 1, wherein the coupon redemption unit is further configured to automatically create the support ticket as a function of the request for reconsideration.

3. The system of claim 1, further comprising a customer inquiry unit implemented on the electronic device of the first customer, the customer inquiry unit is configured to allow the first customer to enter the request for reconsideration and to transmit the request for reconsideration to a support ticket unit.

4. The system of claim 1, wherein the memory unit is configured to store a plurality of coupons comprising the one or more digital coupons, each one of the one or more digital coupons being associated with at least one respective product sold by the retailer.

5. The system of claim 1, wherein the coupon substitution unit is further configured to:
    after the subject product was excluded from an original definition of the at least one digital coupon that was mistakenly denied as not valid for the subject product, associate the subject product with the at least one digital coupon when the request for reconsideration is approved.

6. The system of claim 1, wherein:
the at least one digital coupon has a coupon value associated therewith;
the substitute digital coupon has a substitute value; and
the substitute value is related to the coupon value.

7. The system of claim 6, wherein the substitute value may be applied to the subsequent purchase of the first customer.

8. The system of claim 7, wherein application of the substitute value to the subsequent purchase of the first customer is independent of any product in the subsequent purchase.

9. The system of claim 1, wherein the coupon substitution unit is further configured to allow a customer service representative to interact with the coupon substitution unit to determine whether the subject product matches the at least one product associated with the at least one digital coupon, wherein the customer service representative comprises a software program utilizing a learning program.

10. The system of claim 9, wherein:
the at least one product associated with the at least one digital coupon has a product-to-coupon identification code;
the subject product has a product identification code; and
the customer service representative is configured to determine that that the subject product matches the at least one product associated with the at least one digital coupon even when the product identification code associated with the subject product does not match the product-to-coupon identification code associated with the at least one product associated with the at least one digital coupon.

11. The system of claim 1, wherein:
the coupon substitution unit is further configured to send an electronic message to the first customer of the plurality of customers;
the electronic message indicating to the first customer of the plurality of customers a status of the support ticket for the at least one digital coupon that was mistakenly denied, and
the electronic message comprises:
a text;
an email; or
a voice mail.

12. The system of claim 11, wherein the status of the support ticket further comprises the substitute digital coupon being issued for the at least one digital coupon that was mistakenly denied.

13. A method being implemented via execution of computing instructions configured to run at one or more processors and stored at one or more non-transitory computer-readable media, the method comprising:
storing, with a computer system using one or more processors, in a memory unit, customer data associated with a first customer of a plurality of customers stored in an account of the first customer with a retailer, wherein the account of the first customer of the plurality of customers includes at least a customer identifier and at least one digital coupon associated with at least one product sold by the retailer, wherein one or more digital coupons are provided by the retailer or the first customer, by using an application ("app") downloaded to an electronic device of the first customer, wherein the app is configured to electronically clip the one or more digital coupons from a webpage to be uploaded to the account of the first customer, and wherein the one or more digital coupons comprising the at least one digital coupon;

receiving, by a coupon redemption unit coupled to the memory unit, data associated with a potential purchase by the first customer, wherein the one or more digital coupons stored in the account of the first customer are accessed by a point of sale (POS) terminal of the retailer, wherein the one or more digital coupons stored in the account of the first customer are valid;

receiving, by the coupon redemption unit, a list of products scanned by the POS terminal of the potential purchase by the first customer;

comparing, by the coupon redemption unit, a subject product of the list of products with the one or more digital coupons stored in the account of the first customer;

determining, by the coupon redemption unit, when the subject product matches a product type required by the at least one digital coupon;

when determining a match exists, approving, by the coupon redemption unit, a utilization of the at least one digital coupon for the potential purchase of the subject product wherein the coupon redemption unit transmits the at least one digital coupon and an approval to use the at least one digital coupon to the POS terminal for application of the at least one digital coupon to the potential purchase of the subject product by the first customer;

storing, by the coupon redemption unit, the approval of the utilization of the at least one digital coupon, wherein the coupon redemption unit transmits an approval of at least one other digital coupon to the POS terminal for application of the at least one other digital coupon to a potential purchase of an other customer of the plurality of customers;

determining when the subject product does not match the product type required by the at least one digital coupon;

when determining a match does not exist, transmitting, by the coupon redemption unit, a denial of the at least one digital coupon as not valid for the subject product of the at least one digital coupon for the potential purchase such that the at least one digital coupon is not applied to the potential purchase of the subject product of the first customer, wherein the at least one digital coupon was mistakenly denied;

responsive to the denial of the utilization of the at least one digital coupon, the coupon redemption unit is further configured to transmit an electronic message to the electronic device of the first customer comprising one or more explanations why the at least one digital coupon was denied as invalid based on a product type of the subject product being different from the product type required by the at least one digital coupon;

receiving, by the coupon redemption unit, from the first customer, a request for reconsideration of the denial based on one or more reasons why the at least one digital coupon was mistakenly denied as invalid, wherein the request for reconsideration initiates a review process to review a validity of the at least one digital coupon from the account of the first customer;

generating, by the coupon redemption unit, a support ticket stored in the account of the first customer when the review process determines that a valid digital coupon was improperly denied during the potential purchase by the first customer;

generating, by a coupon substitution unit coupled to the memory unit, the support ticket stored in the account of the first customer when the review process determines that a valid digital coupon was improperly denied during the potential purchase by the first customer; and storing a substitute digital coupon for the at least one digital coupon that was mistakenly denied to be transmitted to the account of the first customer of the plurality of customers as a function of the support ticket, the substitute digital coupon for utilization during a subsequent purchase of the first customer;

informing a third party that supplied the at least one digital coupon of an issue corresponding to the at least one digital coupon that was mistakenly denied; and after the at least one digital coupon was mistakenly denied, adding the subject product of the at least one digital coupon that was mistakenly denied to a list of approved subject products to which the at least one digital coupon can be applied for redemption for other potential purchases by the plurality of customers.

14. The method of claim 13, wherein the coupon redemption unit is further configured to automatically create the support ticket as a function of the request for reconsideration.

15. The method in of claim 13, further comprising a customer inquiry unit implemented on the electronic device of the first customer, the first customer inquiry unit is configured to allow the first customer to enter the request for reconsideration and to transmit the request for reconsideration to a support ticket unit.

16. The method of claim 13, wherein storing, in the memory unit a plurality of coupons comprising the one or more digital coupons, each one of the one or more digital coupons being associated with at least one respective product sold by the retailer.

17. The method of claim 13, further comprising, by the coupon substitution unit, further configured to:

after the subject product was excluded from an original definition of the at least one digital coupon that was mistakenly denied as not valid for the subject product, associate the subject product with the at least one digital coupon when the request for reconsideration is approved.

18. The method of claim 13, wherein:

the at least one digital coupon has a coupon value associated therewith;

the substitute digital coupon has a substitute value; and the substitute value is related to the coupon value.

19. The method of claim 18, wherein the substitute value may be applied to the subsequent purchase of the first customer.

20. The method of claim 19, wherein application of the substitute value to the subsequent purchase of the first customer is independent of any product in the subsequent purchase.

21. The method of claim 13, wherein a customer service representative interacts with the coupon substitution unit to determine whether the subject product matches the at least one product associated with the at least one digital coupon, wherein the customer service representative comprises a software program utilizing a learning program.

22. The method of claim 21, wherein the at least one product associated with the at least one digital coupon has a product-to-coupon identification code and the subject product has a product identification code, wherein the customer service representative is configured to determine that the subject product matches the at least one product associated with the at least one digital coupon even when the product identification code associated with the subject product does not match the product-to-coupon identification code associated with the at least one product associated with the at least one digital coupon.

23. The method of claim 13, wherein:

the coupon substitution unit is further configured to send an electronic message to the first customer of the plurality of customers;

the electronic message indicating to the first customer of the plurality of customers a status of the support ticket for the at least one digital coupon that was mistakenly denied, and the electronic message comprises:

a text;

an email; or a voice mail.

24. The method of claim 23, wherein the status of the support ticket further comprises the substitute digital coupon being issued for the at least one digital coupon that was mistakenly denied or a denial.

25. One or more non-transitory computer-readable storage media, having computer-executable instructions embodied thereon, wherein when executed by at least one processor, the computer-executable instructions cause the processor to operate as a:

a memory unit configured to store customer data associated with a first customer of a plurality of customers stored in an account of the first customer with a retailer, wherein the account of the first customer of the plurality of customers includes at least a customer identifier and at least one digital coupon associated with at least one product sold by the retailer, one or more digital coupons are provided by the retailer or the first customer, by using an application ("app") downloaded to an electronic device of the first customer, wherein the app is configured to electronically clip the one or more digital coupons from a webpage to be uploaded to the account of the first customer, and wherein the one or more digital coupons comprises the at least one digital coupon;

a coupon redemption unit coupled to the memory unit and configured to receive data associated with a potential purchase by the first customer, wherein the one or more digital coupons stored in the account of the first customer are accessed by a point of sale (POS) terminal of the retailer, wherein the one or more digital coupons stored in the account of the first customer are valid; and a coupon substitution unit coupled to the memory unit, wherein:

the coupon redemption unit is further configured to receive a list of products scanned by the POS terminal for the potential purchase by the first customer;

the coupon redemption unit is further configured to compare a subject product of the list of products with the one or more digital coupons stored in the account of the first customer;

the coupon redemption unit is further configured to determine when the subject product matches a product type required by the at least one digital coupon and, after determining a match exists, to approve utilization of the at least one digital coupon for the potential purchase of the subject product, wherein the coupon redemption unit transmits an approval and the at least one digital coupon to the POS terminal for application of the at least one digital coupon to the potential purchase of the subject product by the first customer;

the coupon redemption unit is further configured to store the approval of the utilization of the at least one digital coupon, wherein the coupon redemption unit transmits an approval of at least one other digital coupon to the POS terminal for application of the at least one other digital coupon to a potential purchase of an other customer of the plurality of customers;

the coupon redemption unit is further configured to determine when the subject product does not match the product type required by the at least one digital coupon and, after determining a match does not exist, to transmit a denial of the at least one digital coupon as not valid for the subject product of the at least one digital coupon for the potential purchase such that the at least one digital coupon is not applied to the potential purchase of the subject product of the first customer, wherein the at least one digital coupon was mistakenly denied;

responsive to the denial of the utilization of the at least one digital coupon, the coupon redemption unit is further configured to transmit an electronic message to the electronic device of the first customer comprising one or more explanations why the at least one digital coupon was denied as invalid based on a product type of the subject product being different from the product type required by the at least one digital coupon;

the coupon redemption unit is further configured to receive, from the first customer, a request for reconsideration of the denial based on one or more reasons why the at least one digital coupon was mistakenly denied as invalid, wherein the request for reconsideration initiates a review process to review a validity of the at least one digital coupon from the account of the first customer;

the coupon redemption unit is further configured to generate a support ticket stored in the account of the first customer when the review process determines that a valid digital coupon was improperly denied during the potential purchase by the first customer;

the coupon substitution unit is configured to (i) store a substitute digital coupon for the at least one digital coupon that was mistakenly denied to be transmitted to the account of the first customer of the plurality of customers as a function of the support ticket, the substitute digital coupon for utilization during a subsequent purchase of the first customer and (ii) inform a third party that supplied the at least one digital coupon of an issue corresponding to the at least one digital coupon that was mistakenly denied; and after the at least one digital coupon was mistakenly denied, the coupon redemption unit is further configured to add the subject product to a list of approved products to which the at least one digital coupon can be applied for redemption for other potential purchases by the plurality of customers.

\* \* \* \* \*